United States Patent [19]

Voltmer et al.

[11] Patent Number: 4,624,734

[45] Date of Patent: Nov. 25, 1986

[54] LABEL DISPENSER WITH ARTICULATED GUIDE

[75] Inventors: Helmut Voltmer, Park Ridge; Alfred F. Schwenzer, Totowa, both of N.J.

[73] Assignee: New Jersey Machine Inc., Fairfield, N.J.

[21] Appl. No.: 662,762

[22] Filed: Oct. 19, 1984

[51] Int. Cl.[4] .......................... B44C 1/00; B32B 31/00; B65H 26/00; B65H 23/32

[52] U.S. Cl. .................................... 156/541; 156/542; 156/361; 156/DIG. 33; 156/DIG. 37; 226/197; 221/73

[58] Field of Search ............ 156/361, 363, 391, 477.1, 156/478, 539, 540, 541, 584, 556, 568, 542, DIG. 33, DIG. 37; 226/197, 196; 271/312, 900; 221/73

[56] References Cited

U.S. PATENT DOCUMENTS 3,832,261 8/1974 Brey et al. .......................... 156/568
4,017,350 4/1977 Thomas .............................. 156/584
4,187,968 2/1980 Winterholler et al. ............ 226/197
4,385,716 5/1983 DeRoeck et al. .................. 226/197

*Primary Examiner*—Edward Kimlin
*Assistant Examiner*—Louis Falasco
*Attorney, Agent, or Firm*—Charles E. Baxley

[57] ABSTRACT

A label dispenser for applying labels to containers transported via a conveyor includes a supply of labels carried by a web, a head for transferring the labels from the web to the containers, and a guide assembly which joins the head to the supply station. The length of the guide assembly is selected to space the supply station away from the head and from the conveyor thereby to provide space for other equipment alongside the conveyor. Web delivering labels to the head and spent web are both carried within the guide assembly in close proximity to each other to minimize the cross-sectional dimensions of the guide assembly. A set of rails is angled relative to the path of travel, the web making slidable contact with the rails and being folded thereabout to provide for a bending of the path, thereby to accommodate an angling of the head relative to the guide assembly for alignment with the conveyor.

11 Claims, 4 Drawing Figures

LABEL DISPENSER WITH ARTICULATED GUIDE

BACKGROUND OF THE INVENTION

This invention relates to label dispensers for applying labels to containers and other packages and, more particularly, to a dispenser having an elongated guide assembly for separating a label supply station from a dispenser head to reduce space requirements alongside of a conveyer of the containers.

In the packaging industry, containers such as bottles, cartons, and other packages are transported along a conveyer past a number of stations, each of which includes equipment for performance of a packaging task. For example, these stations may provide the tasks of filling a bottle with a powdery or liquid substance, closing the bottle with a cap or other closure device, applying a label to the bottle, applying a seal to the bottle, and, possibly, stamping the bottle with some form of legend or art work. In the event that the bottle is provided with a specific shape, such as a rectangular cross-sectional shape, the conveyor line may also include equipment for reorienting the bottle for receiving a specific label, seal, or printing.

A problem arises in that the equipment disposed at the various stations for accomplishing the foregoing packaging steps may occupy an excessive amount of space within the packaging plant. It is readily appreciated that the arrangement of equipment to accommodate personnel and other considerations in the layout of a packaging plant can best be accomplished by minimizing the space required for the various packaging operations. In particular, there are situations wherein an additional labeling machine is to be inserted in the packaging line and, accordingly, space must be provided for such additional labeling machine. Unfortunately, existing dispensers and applicators of labels have a physical size which militates against insertion within an existing packaging line without substantial modification of the line, including the necessity for extending the conveyor and the repositioning of existing packaging equipment alonside the conveyor.

SUMMARY OF THE INVENTION

The foregoing problem is overcome and other advantages are provided by a label dispenser incorporating the invention located adjacent a conveyor of containers for applying labels to the containers. The dispenser comprises a supply station which provides a web with labels secured thereto, a dispensing head which transfers labels from the web to successive ones of the containers, and a guide assembly within which the web travels between the station and the head. The head is disposed alongside the conveyor and positioned at a desired height for contacting the containers. For example, the head may be positioned above the containers for applying labels to the covers of containers.

In accordance with the invention, the guide assembly has an elongated form, the length thereof being selected for spacing the supply station away from the head at a sufficient distance to clear other packaging equipment in the vicinity of the conveyor. Thereby, only the head requires space near the conveyor.

In accordance with a further feature of the invention, the supply station includes a take-up spool for receiving spent web from the head after separation of the labels from the web. Both the path of the web delivering the labels and the path of the retrieved spent web pass adjacent each other in the guide assembly so as to minimize space required by the guide assembly and for the processing of the web.

The outboard end of the guide assembly is angled so as to align the head with the conveyor thereby to facilitate the transference of the labels from the web to containers moving past the head. Thus, the orientation of the head differs from that of the guide assembly and the supply station.

In accordance with yet another feature of the invention, the guide assembly includes rails about which the web is folded to bend the foregoing paths, and thereby orient a terminal portion of each path in line with the head. The web slides over the rails. The rails are angled in the range of approximately forty degrees to fifty degrees relative to a leg of the path for bending the path approximately eighty degrees to one hundred degrees. In a typical installation of the invention, segments of the web are disposed in planar form, both before and after the folding operation, with the respective planar segments being parallel to each other. Thereby, the path of the web can be redirected without a twisting which would tend to stretch and deform the web. The foregoing elongation of the guide assembly, and the angulation of the dispensing head relative to the guide assembly permit the head to be located alongside the conveyor in a relatively small space between existing packaging equipment while the remaining portion of the label dispenser, particularly the supply of web and pick-up of spent web, are located at a distance from the conveyor so as to clear the existing equipments.

BRIEF DESCRIPTION OF THE DRAWING

The aforementioned aspects and other features of the invention are explained in the following description taken in connection with the accompanying drawings wherein.

DETAILED DESCRIPTION

Figure 1:
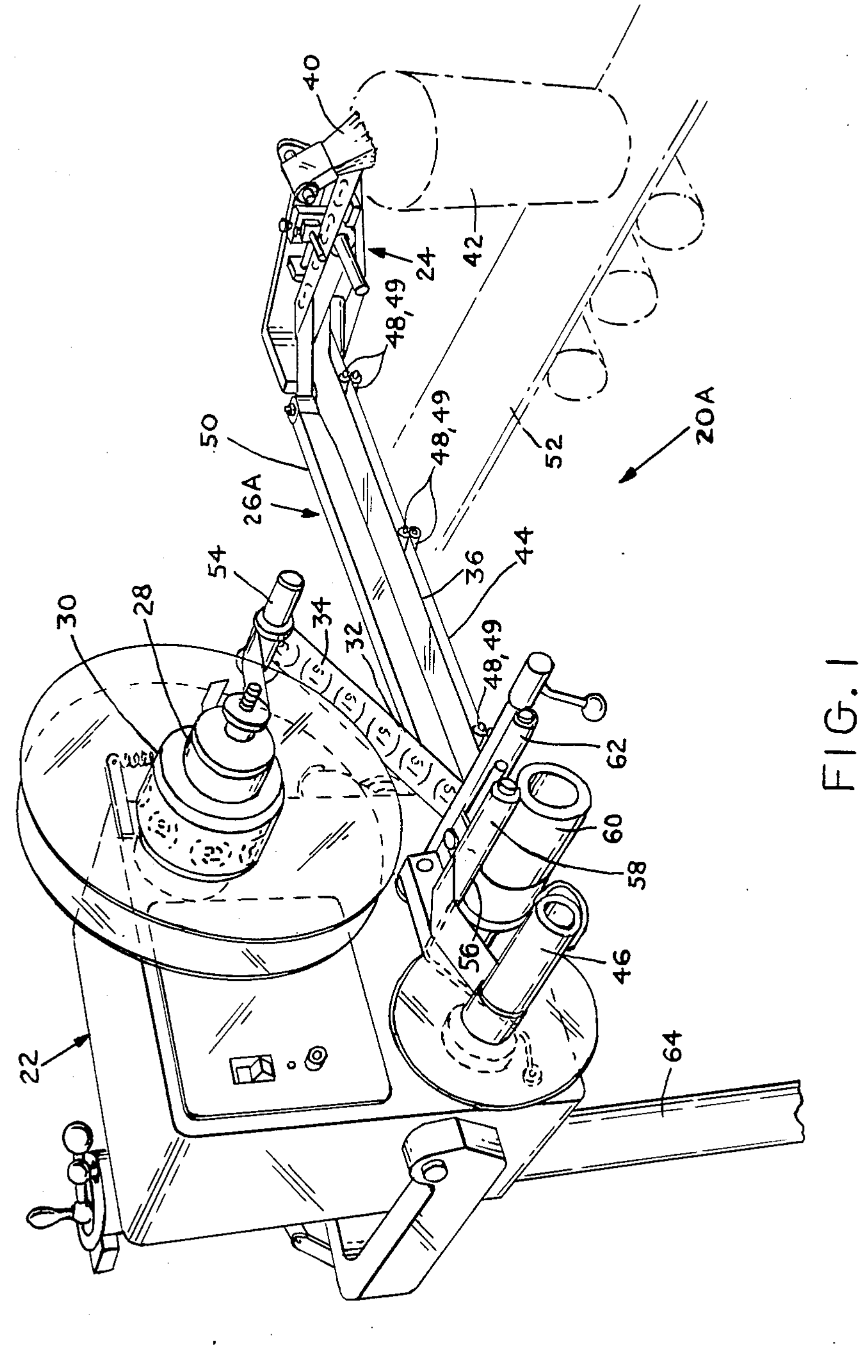
FIG. 1 is an isometric view of a label dispenser having an elongated guide assembly with web folding rails.
Figure 2:
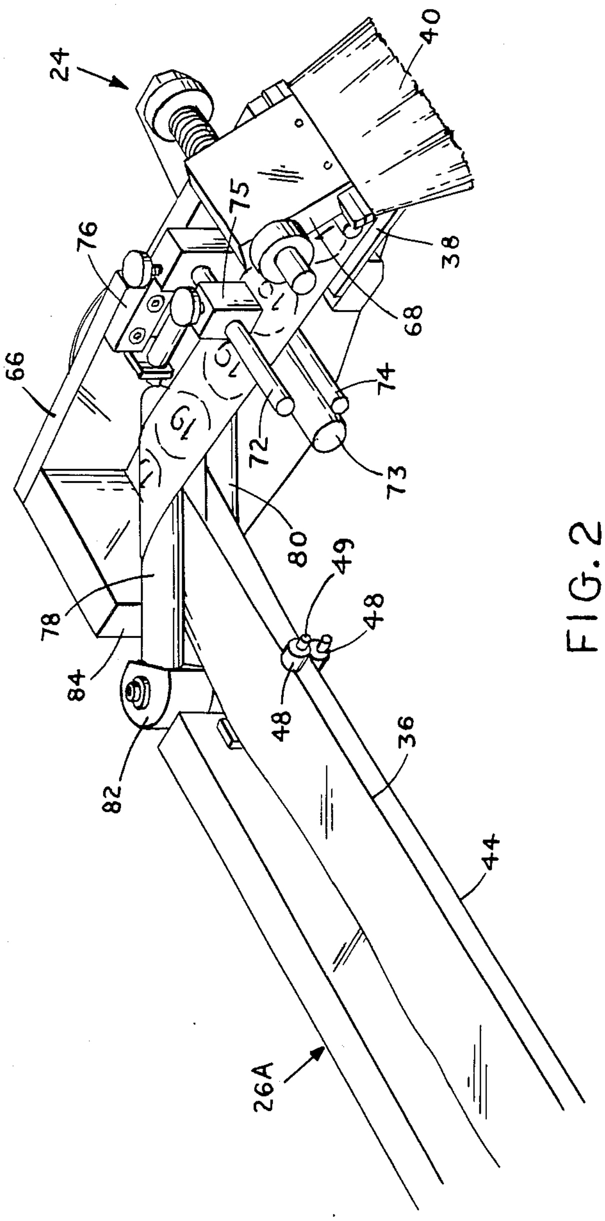
FIG. 2 is an enlarged isometric view of a dispensing head of the dispenser of FIG. 1.
Figure 3:
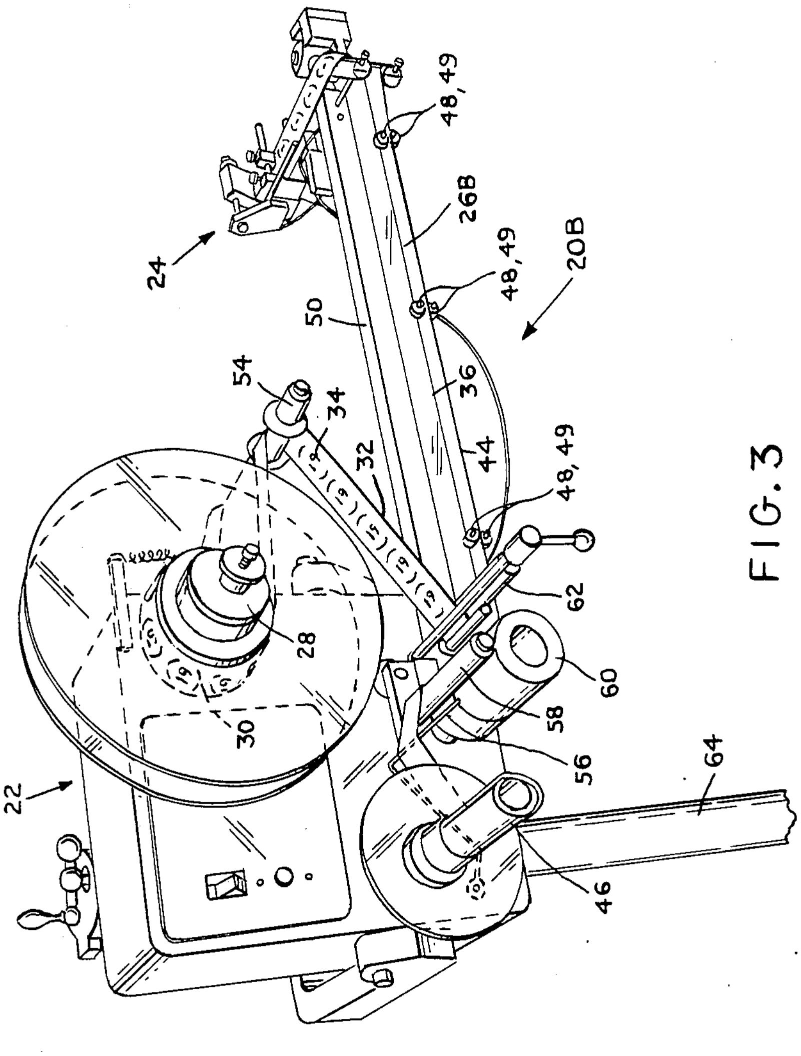
FIG. 3 is an alternative configuration of the label dispenser of the invention comprising an elongated guide assembly with folding rails accomplishing a folding of the web in the reverse direction of the embodiment of FIG. 1.
Figure 4:
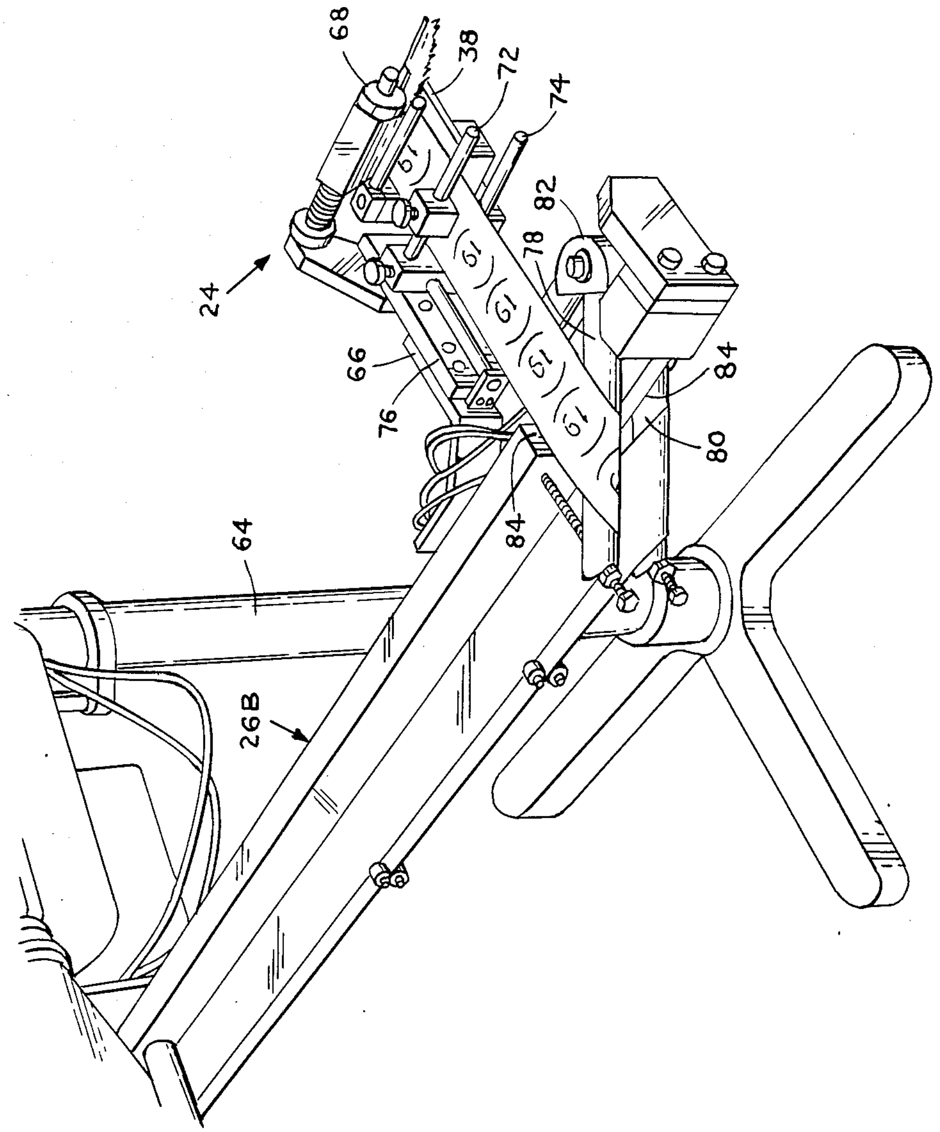
FIG. 4 is an enlarged isometric view of the dispenser head of the embodiment of FIG. 3.

With reference now to FIGS. 1–4, there are shown two label dispensers 20A (FIGS. 1 and 2) and 20B (FIGS. 3 and 4) each of which includes a label supply station 22 and a dispenser head 24. In each of the dispensers 20A–B, the station 22 and the head 24 are joined together by a guide assembly 26. The assembly 26 is further identified by the legends A and B when it is desired to indicate employment in the dispensers 20A and 20B, respectively. The two dispensers 20A–B are of the same form, except that in the dispenser 20A the guide assembly 26A has an outer terminus which bends to the right for orienting the dispenser head 24 towards the right while, in the dispenser 20B, the guide assembly 26B has an outer terminus which bends to the left for orienting the dispenser head 24 to the left. Except for the foregoing distinction, the two dispensers 20A–B comprise the same components and, accordingly, the FIGS. 2 and 4 are useful for portraying front and back isometric views of the same dispenser head 24.

The supply station 22 comprises a supply spool 28 rotatably supporting a supply roll 30 of web 32 having labels 34 adhesively secured thereto. While, in this embodiment of the invention, the web 32 has been previously supplied with the labels 34 before formation of the roll 30, it is to be understood that an alternative form of supply may be utilized wherein the labels are provided by a well-known hopper (not shown) from which the labels are fed onto the web 32. The web 32 unrolls from the roll 30 and advances along an upper path 36 in the guide assembly 26 to the head 24 wherein the labels 34 are separated from the web 32 by a peel plate 38. Upon separation of the label 34 from the web 32, the separated label 34 is directed by the peel plate 38 and a brush 40 of the head 24 against a bottle 42 (or other form of container) shown in phantom.

The web 32 remaining after separation of the labels 34 by the plate 38 is referred to as spent web and is conducted along a lower path 44 of the guide assembly 26 for retrieval by a take-up spool 46 also located at the supply station 22.

In accordance with a feature of the invention, the location of both the supply spool 28 and the take-up spool 46 at the supply station 22 permits both of the spools 28 and 46 to be located at a distance from the head 24. The passage of the web 32 along the upper path 36 for delivery of labels 34 to the head 24, and the passage of the web 32 along the lower path 44 for retrieval of the spent web 32 is accomplished within a geometry of guide assembly 26 wherein both paths 36 and 44 are adjacent each other, this reducing the amount of space occupied by the guide assembly 26. Sets of support shafts 49 with guide collars 48 extend transversely from a supporting member, to be referred to hereinafter as leg 50, of the guide assembly 26 for supporting the web 32 in the upper and lower paths 36 and 38 during transport of the web 32 between the station 22 and the head 24. The length of the leg 50 is selected in accordance with the desired spacing between the head 24 and the station 22. This spacing permits the station 22 to be located at a site remote from a conveyor 52 (shown in phantom) which transports the bottle 42 past the head 24. Thereby, the length of the leg 50, and the relatively small transverse dimensions of the guide assembly 26 resulting from the aforementioned adjacent spacing of the paths 36 and 44, permit access to the head 24 and a positioning of the head 24 alongside the conveyor 52 while requiring no more than a minimal spacing between other packaging equipment (not shown) which may be positioned also alongside the conveyor 52.

Also included at the supply station 22 are well-known guide rolls 54 and 56 positioned relative to the spools 28 and 46 for guiding the web 42 from and to the respective spools 28 and 44. Additional rollers 58, 60 and 62 direct the web 32 from the guide rolls 54 and 56 to the upper and lower paths 36 and 44 established by the support shafts 49. A stand 64, best shown in FIG. 4, supports the station 22 and the guide assembly 26 which extends from a bottom portion of the station 22, as well as the head 24 positioned at the outer terminus of the guide assembly 26.

The head 24 includes a frame 66 to which the brush 40 is secured by a spring-loaded brush holder 68. The return path of the web (lower path 44) is directed by a rod 73 from the peel plate 38 to the angular rod 80. The rod 72 carries a photo-receiver mounted in a lateral adjustable block 75. The rod 74 carries a similar block (not shown) with a light source. This combination light-source - photoreceiver is the label register system, generating the signal to stop the web advance. The intensity of the lamp is adjusted to shine through the backing paper only and thereby generating a "high" signal in the photo-receiver, while the presence of a label on the web renders the path of light more opaque and thereby generating a "low" signal in the receiver. This characteristic is utilized to stop the web advance each time the light level switches from "low" to "high", made possible by the characteristic of a typical strip of pressure sensitive label web, where a gap always exists between successive labels on the carrier web.

In accorance with an important feature of the invention, the upper and lower paths 36 and 44 are bent at the outer terminus of the guide assembly 26 by means of upper and lower rails 78 and 80 which are oriented obliquely to the upper and lower paths 36 and 44. In the embodiment disclosed in FIG. 2 (and the corresponding embodiment of FIG. 4) the rails 78 and 80 are angled 45° relative to the leg 50 for bending each of the paths 36 and 44 by 90°. The foregoing angulation of the rails 78 and 80 relative to the leg 50 may be decreased or increased as desired over a range of angles of approximately 40° to 50° for a path bending over a range of approximately 80° to 100°, thereby to align the head 24 with the conveyor 52. A pedestal assembly 82 may be secured within slots 84 of the leg 50 (as shown in FIG. 2 for the guide assembly 26A) or alongside the slots 84 (as shown for the guide assembly 26B in FIG. 4) for supporting one end of each of the rails 78 and 80. The opposite ends of the rails 78 and 80 are pinned to either the frame 66 (guide assembly 26A of FIG. 2) or the leg 50 (guide assembly 26B of FIG. 4).

Each of the rails 78 and 80 is provided with a smooth circular cylindrical surface about which the web 32 is slidably drawn. The radii of curvature of the cylindrical surfaces is sufficiently large, greater than approximately one-half inch, so as to permit the labels 34 to bend with the web 32 without separation therefrom as the web 32 is folded over itself by passage over the rails 78 and 80. It is noted that the bending of the web 32 abut the rails 78 and 80 differs from the bending of the web 32 about the edge of the peel plate 38 in that the radius of curvature of the edge of the peel plate 38, as is well-known, is sufficiently small such that the labels 34 do not bend with the web 32 but lift-off and are thereby separated from the web 32. In contradistinction, the radii of curvature of the foregoing rails 78 and 80, as noted hereinabove, is sufficiently large to prevent such separation of the lebels 34 from the web 32.

It is also noted that the segments of web 32 to either side of the upper rail 78, and to either side of the lower rail 80 are essentially flat, or of planar form. In addition, these four segments are parallel to each other. Thereby, the path of travel of the web 32 has been bent within the plane of the web 32, such bending introducing a reversal of the web 32, the lower surface becomes the upper surface, without any twisting and deforming of the web 32 as would occur with some other form of reorientation of the path of travel of the web.

The foregoing description of the invention has provided for a physical structure which separates the dispensing head 24 from the supply station 22 while angling the head 24 relative to the guide assembly 26 and the station 22 for alignment with the conveyor 52. Such an arrangement permits the installation of the label dispenser 20 of the invention into a confined region on the packaging line to be deployed with other packaging equipment alongside the conveyor 52.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

We claim:

1. A label dispenser for applying labels to containers transported in a given direction of travel along a conveyer comprising:

a supply station providing a web with labels disposed thereon in pressure sensitive fashion;

a dispensing head including means for transferring labels in said direction from the web to individual ones of the containers; and a guide assembly interconnecting said station and said head and including means for guiding the web along a path of travel between said station and said head, said head being angled relative to said guide assembly for alignment with said direction of travel of said conveyor; and wherein said guide assembly includes means for folding the web about itself on a line of folding thereby to bend said path of travel for alignment with said head, the line of folding being angled relative to a leg of said path by an angle in a range of approximately 40° to 50°.

2. A label dispenser according to claim 1 wherein said path is bent at a right angle.

3. A label dispenser according to claim 1 wherein segments of the web before and after said folding are disposed in planes parallel to each other.

4. A label dispenser according to claim 3 wherein said path is bent at a right angle.

5. A label dispenser according to claim 3 wherein said station comprises means for supplying said web with said labels thereon and means for receiving spent web; said guide assembly providing for the delivery of labels to said head along said path of travel, and for retrieval of spent web from said head to said receiving means along a second path of travel parallel to said first mentioned path of travel, said first and said second paths of travel being adjacent each other to minimize space occupied by said guide assembly.

6. A label dispenser according to claim 5 wherein said head is disposed alongside said conveyor and said guide assembly is elongated and extends away from said head to space said station away from said conveyor, thereby to minimize size of said label dispenser in the vicinity of said conveyor.

7. A label dispenser according to claim 6 wherein said head comprises a peel plate for separation of labels from said web, and a brush assembly for directing separated labels from said peel plate to a container.

8. A label dispenser according to claim 7 wherein said head further comprises means for guiding said web between a first surface of said peel plate and said first mentioned path of travel, and a second surface of said peel plate and said second path of travel of said web.

9. A label dispenser according to claim 6 wherein said guide assembly comprises a leg extending outwardly from said station, and plural sets of upper and lower rollers extending transversely of said leg for supporting said web along said first and said second paths of travel.

10. A label dispenser according to claim 6 wherein said folding means comprises a pair of upper and lower guide rails each having a rounded cylindrical surface of predetermined radius of curvature for slidable engagement with the web traveling respectively along said first and said second paths of travel, each of said rails having an axis parallel to said line of fold, the radii of curvature of said guide rails being sufficiently large to induce a bending of said web and of said labels without inducing a separation of said labels from said web.

11. A label dispenser according to claim 3 wherein said guide assembly comprises a leg extending outwardly from said station and plural sets of upper and lower rollers extending transversely of said leg for supporting said web along said first and said second paths of travel.

* * * * *